United States Patent [19]

Bjorkholm et al.

[11] 4,303,840
[45] Dec. 1, 1981

[54] SINGLE BEAM SECOND HARMONIC GENERATION IN ISOTROPIC MEDIA

[75] Inventors: John E. Bjorkholm, Holmdel; Richard R. Freeman, Middletown; Richard L. Panock, Ocean, all of N.J.; William E. Cooke, Los Angeles, Calif.

[73] Assignee: Bell Telephone Laboratories, Incorporated, Murray Hill, N.J.

[21] Appl. No.: 201,145

[22] Filed: Oct. 27, 1980

[51] Int. Cl.³ .............................................. H03F 7/00
[52] U.S. Cl. .................................... 307/427; 307/425
[58] Field of Search ................................ 307/427, 425

[56] References Cited

PUBLICATIONS

"Phys. Review", vol. 130, No. 3, May 1963, pp. 919-929, Pershan.
"Phys. Review Letters", Aug. 1976, pp. 431-434, by Bethune et al.
"Phys. Review Letters", Jan. 1977, pp. 59-62, by Flusberg et al.
"Phys. Review Letters", Apr. 1977, pp. 894-898, by Matsuoka et al.
"Phys. Rev. A.", Jan. 1978, pp. 277-292, by Bethune et al.
"Optics Comm.", Apr. 1978, pp. 121-124 by Mossberg et al.
"Phys. Rev. Letters", Oct. 1979, pp. 1154-1157 by Mayazaki et al.

*Primary Examiner*—David C. Nelms
*Assistant Examiner*—Darwin R. Hostetter
*Attorney, Agent, or Firm*—Michael B. Einschlag

[57] ABSTRACT

The present invention relates to an apparatus for providing second harmonic generation from a single beam in an isotropic medium. An isotropic medium having a two-photon transition between a first level and a second level with a quadrupole moment therebetween is exposed to a beam of laser radiation. The photons in the laser beam have an energy which is substantially equal to one-half the energy difference between the first and second levels.

5 Claims, 4 Drawing Figures

SINGLE BEAM SECOND HARMONIC GENERATION IN ISOTROPIC MEDIA

BACKGROUND OF THE INVENTION

The present invention pertains to the field of nonlinear optics and in particular to second harmonic generation.

An article entitled "Nonlinear Optical Properties of Solids: Energy Considerations", *Physical Review*, Vol. 130, No. 3, May 1, 1963, pp. 919–929, by P. S. Pershan discusses second harmonic generation by means of electric quadrupole effects. In particular his analysis determines that for an isotropic material a plane wave cannot provide collinear second harmonic generation. He determined that in order to produce the second harmonic radiation in an isotropic material it is necessary to utilize two noncollinear plane waves at the fundamental frequency.

An article entitled "Optical Quadrupole Sum-Frequency Generation in Sodium Vapor", *Physical Review Letters*, Vol. 37, No. 7, Aug. 16, 1976, pp. 431–434, by D. S. Bethune, R. W. Smith, and Y. R. Shen and an article entitled "Sum-Frequency Generation Via a Resonant Quadrupole Transition in Sodium", *Physical Review A*, Vol. 17, No. 1, January 1978, pp. 277–292, by D. S. Bethune, R. W. Smith, and Y. R. Shen both indicate that collinear quadrupole sum-frequency generation is not possible in an isotropic medium. These articles then go on to disclose sum frequency generation by means of three-wave mixing which entails the use of two noncollinear electromagnetic waves.

An article entitled "Optical Difference-Frequency Generation in Atomic Thallium Vapor", *Physical Review Letters*, Vol. 38, No. 2, Jan. 10, 1977, pp. 59–62, by A. Flusberg, T. Mossberg, and S. R. Hartmann discloses sum frequency generation by means of two collinear laser beams in the presence of a weak static transverse magnetic field. The article indicates that the transverse magnetic field breaks the symmetry of the medium, which symmetry breaking allows three-wave mixing to occur by an E2 interaction.

An article entitled "Optical Second-Harmonic Generation in Gases: "Rotation" of Quadrupole Moment in Magnetic Field", *Physical Review Letters*, Vol. 38, No. 16, Apr. 18, 1977, pp. 894–898, by M. Matsuoka, H. Nakatsuka, H. Uchiki, and M. Mitsunaga discusses the fact that whereas collinear second harmonic generation was not possible in sodium, it was possible to provide a collinear three-wave mixing in the medium with transverse magnetization. The article then reports an experiment in which a second harmonic was generated from sodium and calcium vapor in a transverse dc magnetic field.

An article entitled "Optical Second-Harmonic Generation in Atomic Thallium Vapor", *Optics Communications*, Vol. 25, No. 1, April 1978, pp. 121–124, by T. Mossberg, A. Flusberg, and S. R. Hartmann discloses second harmonic generation in atomic thallium vapor when the fundamental was tuned to half the resonance frequency in the following transitions: $6^2P_{\frac{1}{2}}-7^2P_{\frac{1}{2}}$ and $6^2P_{\frac{1}{2}}-8^2P_{\frac{1}{2}}$ in the absence of any external field. The article reports that "SHG on these transitions is very surprising, especially in view of the lack of an appreciable multipole moment on either transition". The article explains their result in terms of a partial photoionization of the $7^2P_{\frac{1}{2}}$ state population. This gives rise to a radial electric field due to the macroscopic charge separation, which radial field breaks the symmetry and induces the second harmonic generation.

An article entitled "Spontaneous-Field-Induced Optical Second-Harmonic Generation in Atomic Vapors", *Physical Review Letters*, Vol. 43, No. 16, Oct. 15, 1979, pp. 1154–1157, by K. Miyazaki, T. Sato, and H. Kashiwagi discusses second harmonic generation in centrosymmetric media. They discuss the fact that SHG in centrosymmetric media is strictly forbidden by parity conservation or symmetry. In the paper they discuss a theory and an experiment to show that a laser pulse with a spatial intensity gradient irradiating a dispersive atomic vapor induces a static electric field and generates second harmonic in the atomic medium due to the E1 interaction. They point out that the presence of any external field applied to the medium or any resonant condition is not necessary. The basis upon which their prediction is based is the fact that a static electric field may be induced in the medium by means of the application of the aforementioned laser pulse. This assumption is erroneous. A study of the second harmonic signal versus laser intensity in FIG. 3 of the Miyazaki et al article indicates that the intense laser beam applied by the authors has produced an electric field by means of multistep photoionization and not by means of the production of a static electric field.

SUMMARY OF THE INVENTION

The present invention relates to an apparatus for providing second harmonic generation from a single beam in an isotropic medium. An isotropic medium having a two-photon transition between a first level and a second level with a quadrupole moment therebetween is exposed to a beam of laser radiation. The photons in the laser beam have an energy which is substantially equal to but not necessarily identical to one-half the energy between the first and second level.

DETAILED DESCRIPTION

Figure 1:
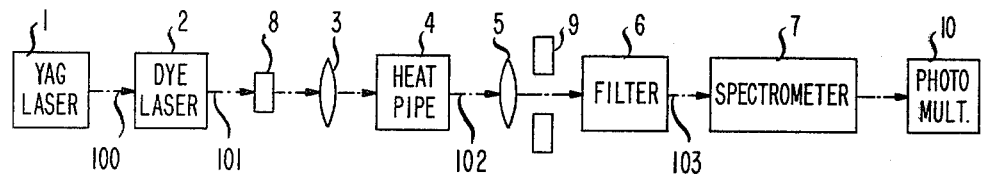
FIG. 1 shows in pictorial form an embodiment of the present invention.

FIG. 1 shows an embodiment of the present invention for providing second harmonic generation in atomic sodium vapor. Laser radiation in beam 101 having wavelengths in the vicinity of 5788 angstroms was loosely focused by focusing means 3 into heat pipe cell 4. Radiation in this vicinity was expected to excite the two-photon 3S-4D two-photon transition, which subsequently radiates coherently via a quadrupole transition between the two levels. Heat pipe cell 4 contains a sodium vapor whose density was varied from approximately $10^{15}$ to $10^{16}$ cm$^{-3}$ and 40 Torr of helium, which helium was used to protect the windows of the cell. The cell had a hot zone of sodium density which was approximately 10 cm long and beam 101 was focused so that a confocal parameter of 4 cm was achieved in cell 4. Beam 101 was output from dye laser 2 and laser 2 was pumped by laser beam 100, which beam 100 emanated from QUANTA-RAY Nd:YAG laser 1. The laser output mode in beam 101 was a donut mode chiefly due to the output of Nd:YAG laser 1. Beam 101 was spatially filtered by spatial filter 8 so that it would approximate a Gaussian spatial intensity distribution. Beam 102 emerging from heat pipe cell 4 was focused by focusing means 5, through pinhole aperture 9, through Corning 7-54 filter 6 onto ¼ meter spectrometer 7. A 1P-28 photomultiplier 10 was used to record the signal at the output of spectrometer 7. The resolution of spectrometer 10 was 0.1 angstrom. The wavelengths observed in the filtered beam 103 were in the vicinity of 2894 angstroms and the output intensity of the doubled light did not depend upon the pressure of the He buffer gas over the range of 10 to 100 Torr.

Figure 2:
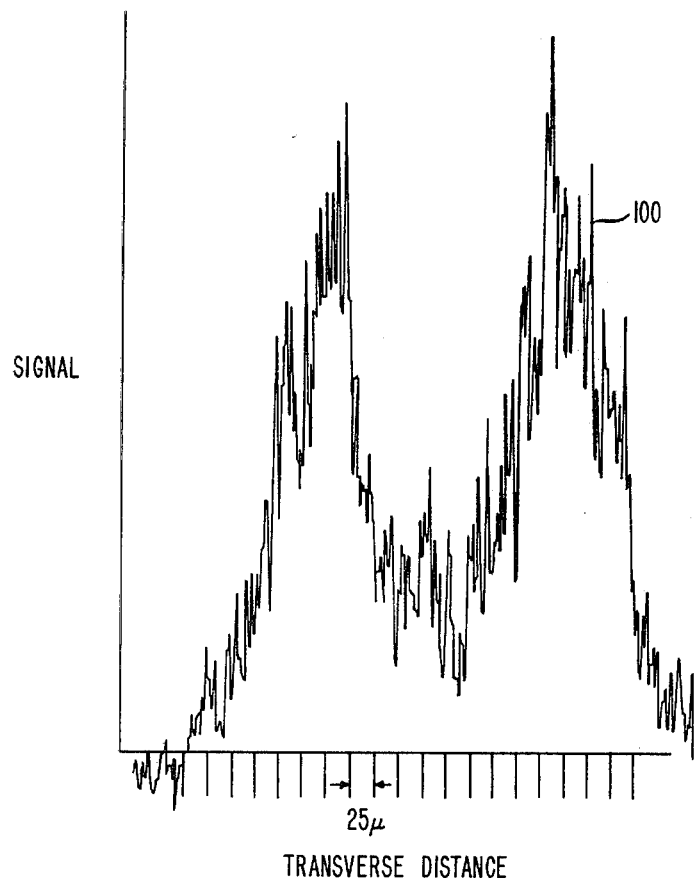
FIG. 2 shows in graphical form, the intensity from a scan of a pin hole across the spatial mode of the output second harmonic radiation.

FIG. 2 shows the results of the scan of pinhole aperture 9 across the spatial mode of the doubled beam 102 when input beam 101 is a spatially filtered Gaussian and input beam 102 is linearly polarized. The tracing in FIG. 2 is taken across the output beam 102 along the direction of the polarization of input beam 101. When output beam 102 is scanned in the direction perpendicular to the direction of polarization of input beam 101, across the center, no doubled light intensity is recorded, only background fluorescence. If input beam 101 is circularly polarized, output beam 102 intensity is found to be a "donut", that is, having no intensity in the middle, but essentially equal intensity at all points of a given radius. Output beam 102 was found to have its maxima at a radius greater than the intensity profile of input beam 101. The polarization of output beam 102 depended upon the polarization of input beam 101. When input beam 101 was linearly polarized, output beam 102 was linearly polarized in the same direction. When input beam 101 was circularly polarized, output beam 102 was found to have no preferred polarization direction.

Figure 3:
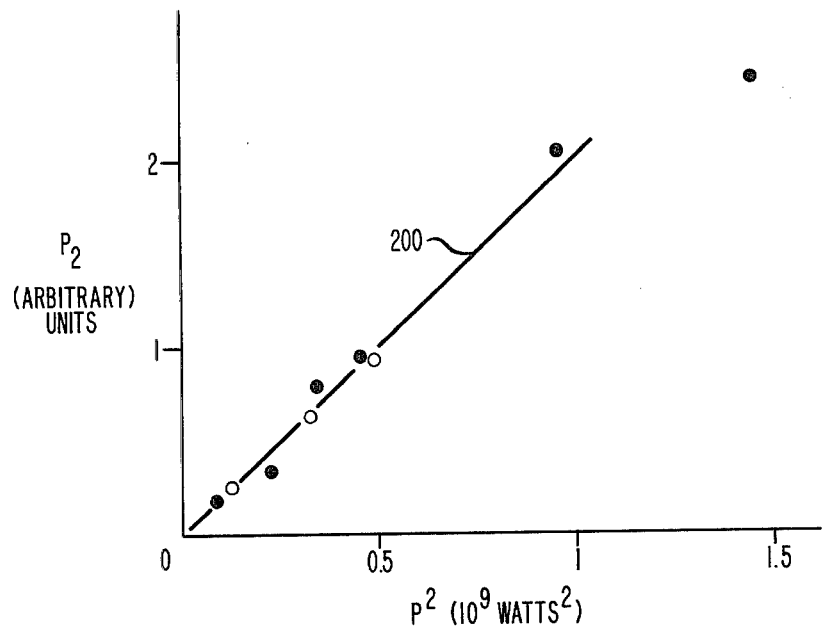
FIG. 3 shows in graphical form the output power of the second harmonic radiation versus the square of the input laser power.

The input energy of beam 101 could be varied from approximately 100 $\mu J$ at a pulse length of 5 nanoseconds to an energy greater than 15 mJ. Using the energy variation we determined the intensity dependence of the doubled output on the intensity of the input laser radiation. We found that for most intensities the doubled output scaled as the square of the input intensity and saturated to scale linearly at higher input power. Curve 200 in FIG. 3 shows a plot of the doubled output power versus the square of the input power. The good agreement between the square of the input power and the output power indicates that we have not observed an ionization effect because with this particular choice of input laser frequency the ionization mechanism requires three-photons. The intensity for which the output saturated was found to depend upon the tuning of the laser input radiation relative to the two-photon frequency.

In addition to the doubled light, we observed a broadband fluorescence background, the intensity of which depended upon how far the input laser was tuned from the two-photon resonance. The resolved spectrum of this fluorescence showed it to be asymmetrically distributed about the two-photon resonance for all input wavelengths. Furthermore, the amount of the fluorescence, as well as its spectral character, depended upon the wavelength of the input laser radiation in beam 101.

The efficiency of the process was measured to be greater than $10^{-5}$ on the two-photon resonance with an input of 10 mJ. The efficiency measurement was probably saturated and the small signal conversion efficiency is probably even higher.

The output intensity of the doubled light depended upon the wavelength of the input radiation in beam 101. The intensity as a function of wavelength was asymmetric with respect to the 3S-4D two-photon transition which is shown by curve 300 in FIG. 4. The doubled output intensity was greater on the red side than on the blue and the highest output occurred near the two-photon frequency. The measurable output in our apparatus extended to greater than 20 angstroms away from the two-photon resonance on the red side and at least 5 angstroms on the blue side. We were precluded from extending our measurements on the blue side because the dye in dye laser 2 was near its short wavelength end.

To confirm our hypothesis that the doubling was provided by the quadrupole transition we attempted to observe the radiation doubling by tuning laser beam 101 to the 3S-5S two-photon transition in sodium at 6024 angstroms. We observed significant amounts of fluorescence, which fluorescence depended upon the tuning of laser beam 101 about the two-photon resonance but we obtained no doubling. We obtained this result for all tunings of laser beam 101 in the vicinity of the 3S-5S two-photon resonance.

As a further check, we simultaneously applied 1.06 micron light to the sodium: first by observing the doubled signal on the 3S-4D transition and second while attempting to observe doubled light on the 3S-5S transition. The application of 1.06 micron light was observed to greatly enhance the ionization rate for both the 3S-5S case and the 3S-4D case. In either case however no difference in the results described hereinabove were observed. That is, even with the greatly enhanced ionization rate produced by the 1.06 micron light we found no increase in the doubling efficiency on the 3S-4D transition and we observed no doubling whatsoever on the 3S-5S transition.

Figure 4:
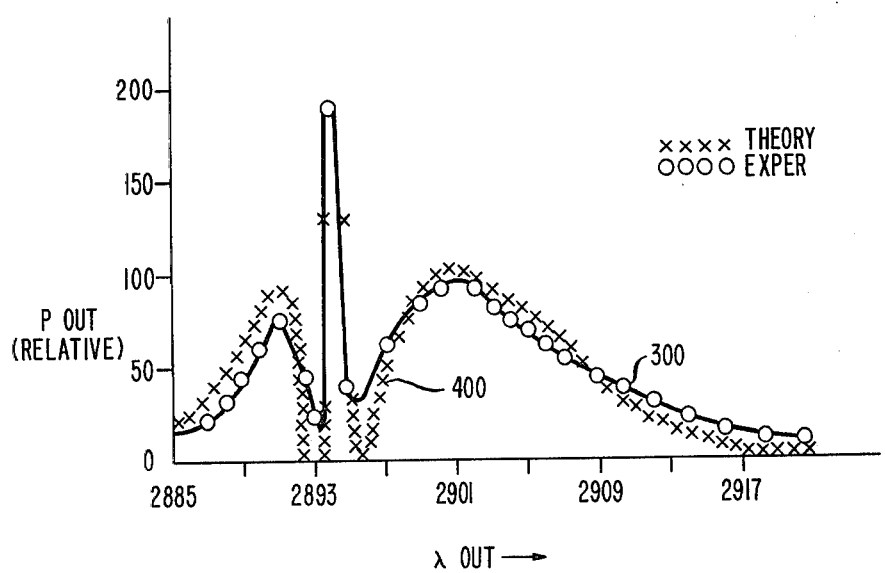
FIG. 4 shows in graphical form the fit of a theoretical curve derived from our understanding of the physical mechanism for generating second harmonic radiation according to our invention with the experimental data.

The hereinabove described observations provide an unambiguous observation of single input beam quadrupole doubling in an isotropic medium. The tuning behavior observed about the two-photon 3S-4D resonance, shown by curve 300 in FIG. 4, is interpreted as being a result of two-photon phasematching. That is, the dispersion introduced in the isotropic material by the two-photon resonance produced phasematching near the two-photon resonance. The observed high output in curve 300 is due to "delta K" going to zero where "delta K" is the sum of the dispersion of the single photon resonance transition at 5890 angstroms and the two-photon resonance.

We have modeled this phasematching effect which takes into account the effects of "delta K" due to the single photon resonance and the two-photon dispersion at the two-photon resonance. In addition, we include the focusing effects, along with the two-photon enhancement in the susceptibility, upon the phasematching integral. The model attempts to include the saturation effects by use of a general line width. This is not exactly correct so we might except it to fail to correctly predict the relative heights of the doubled radiation curve near the resonance where we observe rather large saturation effects. FIG. 4 shows the doubled output in curve 300 for input laser beam 101 energies of 5 mJ/pulse. This input is known to saturate the mechanism, but was chosen because the saturated case will presumably show less of the variation with intensity gradients, which effects were not included in the phasematching calculation. The curve predicted by the theory is shown as curve 400 in FIG. 4 and appears to fit the data of curve 300 quite well considering the approximations we have used.

The spatial mode of the doubled output was described hereinabove can be understood by considering the form of the induced quadrupole amount at the doubled frequency. Consider the case of linearly polarized input light. The quadrupole moment at the doubled frequency tries to radiate in a cone around the axis of the input polarization; the maximum output occurs at 45 degrees to the polarization direction. There is no radiation directly along the input axis. Because the input laser beam is a narrow pencil along the z axis, we expect to find two lobes in the output pattern. These lobes are centered on the plane determined by the z axis and the input polarization. The propagation direction of the two lobes makes a small angle with the z axis. The output mode divergence angle is determined by a competition between the 45 degree cone radiation and limitations set by the interaction volume and phasematching. The exact pattern of the output is determined by the exact shape of the input laser beam and phasematching considerations. We thus expect to find two lobes in the output beam with a larger divergence angle than the "passed-through" fundamental, with polarization in the same plane as the input polarization. This is in agreement with the observations. Consider the case of the input beam having circular polarization. In this case the quadrupole moment is set up so as to rotate in the plane perpendicular to the input axis. The output is expected to have a circular polarization, with a donut spatial mode. This is in agreement with the observations.

The hereinabove described intensity dependence of the doubled output which scales as the square of the input laser intensity, at low intensities, provides confirmation that the observed effect appears to be a true quadrupole doubling. The effect does not depend upon ionization of the sodium atom because this ionization would require at least three-photons at the input laser wavelength.

Finally, the observation of no doubling when the 3S-5S transition is driven confirms the fact that our result is not due to ionization. This is because, while doubling due to stray electric fields is possible in the 3S-5S transition, doubling by quadrupole effects are not.

We have performed a calculation of the expected size of this effect compared to the only previous noncollinear doubling work. We find that the expected size of the effective nonlinearity in our case is the same size, in fact even greater by almost an order of magnitude than the noncollinear case: see for example the Bethune, Smith, Shen article cited hereinabove.

Two examples of further embodiments using the present invention for providing frequency doubling in an isotropic media are found in (1) frequency doubling of a single beam in mercury to generate radiation in the vicinity of 1400 angstroms; the input radiation is at 2800 angstroms and is doubled on the 6S-6D transition and (2) frequency doubling of a single beam in krypton; the input light from an Argon-Fluoride Excimer laser near 1930 angstroms is doubled on the 4p(6)-4p(5)4d' transition with the generated light being in the vicinity of 960 angstroms.

It should be clear to those skilled in the art that the second harmonic generation is a special case of the more general phenomena of sum and difference frequency mechanisms. We would therefore expect to be able to pump a quadrupole transition by either sum or difference frequency laser transitions in order to provide radiation from the quadrupole transition in an isotropic medium.

We claim:

1. Apparatus for providing second harmonic generation of radiation in a laser beam which comprises:
    an isotropic medium, disposed to intercept said radiation in said laser beam, said isotropic medium having a two-photon transition between a first level and a second level with a quadrupole moment therebetween, the energy difference between said first and second levels being substantially close to twice the energy of at least a portion of the photons in said laser beam.

2. Apparatus in accordance with claim 1 wherein said isotropic medium is atomic sodium and said laser radiation includes radiation in the vicinity substantially equal to 5788 angstroms.

3. Apparatus in accordance with claim 1 wherein said isotropic medium is mercury and said laser radiation includes radiation in the vicinity substantially equal to 2800 angstroms.

4. Apparatus in accordance with claim 1 wherein said isotropic medium is krypton and said laser radiation includes radiation in the vicinity substantially equal to 1930 angstroms.

5. Apparatus for providing sum or difference frequency generation of radiation in two collinear laser beams which comprises:
    an isotropic medium, disposed to intercept said radiation in said collinear laser beams, said isotropic medium having a two-photon transition between a first level and a second level with a quadrupole moment therebetween, the energy difference between said first and second levels being substantially close to the sum or difference frequency of at least a portion of the photons in said collinear laser beams.

* * * * *

UNITED STATES PATENT AND TRADEMARK OFFICE
CERTIFICATE OF CORRECTION

PATENT NO. : 4,303,840

DATED : December 1, 1981

INVENTOR(S) : John E. Bjorkholm, Richard R. Freeman, Richard L. Panock and William E. Cooke It is certified that error appears in the above-identified patent and that said Letters Patent is hereby corrected as shown below:

Column 4, line 61, "except" should read --expect--.
Column 5, line 8, "amount" should read --moment--.

Signed and Sealed this

Ninth Day of October

[SEAL]

Attest:

Attesting Officer

GERALD J. MOSSINGHOFF

Commissioner of Patents and Trademarks